United States Patent [19]

Barabas et al.

[11] Patent Number: 4,520,180

[45] Date of Patent: May 28, 1985

[54] POLYMERIZATION OF VINYLPYRROLIDONE TO VARIOUS MOLECULAR WEIGHTS USING A SINGLE INITIATOR SYSTEM CONSISTING ESSENTIALLY OF T-BUTYLPEROXYPIVALATE

[75] Inventors: Eugene S. Barabas, Watchung; James R. Cho, Oakland, both of N.J.

[73] Assignee: GAF Corporation, Wayne, N.J.

[21] Appl. No.: 419,870

[22] Filed: Sep. 20, 1982

[51] Int. Cl.$^3$ .................... C08F 118/08; C08F 126/10
[52] U.S. Cl. .................................. 526/212; 526/216; 526/264
[58] Field of Search ...................... 526/216, 212, 264; 524/765, 767, 808

[56] References Cited

U.S. PATENT DOCUMENTS

| | | | |
|---|---|---|---|
| 3,862,915 | 1/1975 | Fried et al. | 526/264 |
| 3,910,862 | 10/1975 | Barabas et al. | 526/264 |
| 4,027,083 | 5/1977 | Herrle | 526/264 |
| 4,058,655 | 11/1977 | Denzinger et al. | 526/264 |
| 4,361,689 | 11/1982 | Patel et al. | 526/264 |

*Primary Examiner*—Harry Wong, Jr.
*Attorney, Agent, or Firm*—Joshua J. Ward

[57] ABSTRACT

Vinylpyrrolidone is polymerized using free radical initiator consisting essentially of t-Butylperoxypivalate and preferably in solvent consisting essentially of water, isopropyl alcohol, sec. butyl alcohol or mixtures thereof.

12 Claims, No Drawings

POLYMERIZATION OF VINYLPYRROLIDONE TO VARIOUS MOLECULAR WEIGHTS USING A SINGLE INITIATOR SYSTEM CONSISTING ESSENTIALLY OF T-BUTYLPEROXYPIVALATE

BACKGROUND OF THE INVENTION

Polymerization of N-vinyl-2-pyrrolidone (vinylpyrrolidone) by free radical mechanisms is well known and is described for instance in U.S. Pat. Nos. 4,058,655, 4,053,696 and 3,862,915. The polymerization is usually carried out in water or organic solvent using free radical initiators such as hydrogen peroxide, alkyl hydroperoxides, dialkyl peroxides such as di-tert.-butyl peroxide or azodiisobutyronitrile. Previously suggested initiators have, however, not been completely satisfactory. It has for instance been necessary to use different initiator systems depending upon whether low, medium, or high molecular weight polyvinylpyrrolidone (PVP) polymer product is desired. While some variation of molecular weight has been possible with previously used initiators, no single initiator has previously been known which could be used for making PVP of a wide range of molecular weights. It has also been difficult with many initiator and solvent systems to obtain polymer of narrow molecular weight range. The toxicity of decomposition products of commonly used initiators has also frequently resulted in product unsuitable for pharmaceutical use. Other disadvantages have included a need for amine or ammonia buffers with hydrogen peroxide to control pH, the production of undesirable impurities as decomposition products of eg. azodiisobutyronitrile initiator, etc. Previously used peroxides such as di-tert-butyl peroxide require the use of extremely high temperatures.

The various disadvantages inherent in use of previously known initiators are largely eliminated or alleviated by the process of the present invention.

SUMMARY OF THE INVENTION

In accordance with the present invention N-vinylpyrrolidone monomer is polymerized in a reaction zone in the presence of free radical initiator consisting essentially of t-Butylperoxypivalate. In preferred embodiments of the invention the vinylpyrrolidone is polymerized at a temperature between about 40° C. and about 150° C. and in solvent consisting essentially of water, isopropyl alcohol, sec. butyl alcohol or mixtures thereof.

DETAILED DESCRIPTION OF THE INVENTION

As noted above, previously suggested free radical initiators for initiating polymerization of vinylpyrrolidone to polyvinylpyrrolidone (PVP) have not for one reason or other proven entirely satisfactory. It has now been found that many of the disadvantages inherent in use of the previously suggested initiators can be avoided or alleviated by use of t-Butylperoxypivalate as the free radical initiator for polymerization of N-vinylpyrrolidone to PVP. t-Butylperoxypivalate is a known free radical initiator which has previously been suggested for other uses such as initiation of vinyl chloride polymerization reactions, but which has not been previously suggested for use in polymerizing vinylpyrrolidone to PVP. By use of this initiator it has now been found possible to produce PVP of almost any desired molecular weight with the same initiator and to maintain the molecular weight range of the PVP product within narrow limits. Since the use of t-Butylperoxypivalate initiator does not produce toxic decomposition products, this initiator can be used to produce pharmaceutical grade PVP.

In accordance with conventional practice PVP product referred to herein will be characterized primarily in terms of K value. K value is a function of molecular weight and as used herein is calculated by the method set forth in the Encyclopedia of Chemical Technology, Vol. 21, 2nd Ed., p. 427-428 (John Wiley and Sons, 1970).

The present invention is useful in manufacturing PVP having K values ranging from about 10 to about 100 corresponding to number average molecular weights of about 6000 and about 450,000 respectively. K value of PVP produced according to the present invention is dependent primarily upon the amount of isopropyl alcohol or secondary butyl alcohol (sec. butyl alcohol) used relative to the amount of vinylpyrrolidone monomer. Higher K values result from the use of smaller amounts of alcohol. K value is also to some extent influenced by the operating conditions used, especially pressure, temperature and concentration of free radical initiator, i.e. t-Butylperoxypivalate. In general higher temperatures and initiator concentration result in somewhat lower K values for the PVP product. It is usually preferred to adjust the types and proportions of ingredients so as to produce PVP of the generally desired K value range with operating conditions, especially temperature, being used for the final adjustment to obtain the precise K value desired. This technique allows production of PVP of almost any desired K value with very small variation in molecular weight of the product.

While the invention may be practiced using a wide variety of temperature and pressure conditions, one of the advantages of the invention is that it need not be practiced at the elevated temperatures and pressures commonly used with previously known initiator and solvent systems. This is especially true where PVP of relatively low K value is being produced. For PVP of especially low K value such as between about K 10 and about K 20 temperatures between about 100° and about 150° C. and pressures between about 20 psig and about 150 psig are preferred. For PVP of higher K values, e.g. between about K 20 and about K 90 temperatures between about 40° and about 100° C. and pressures between about 0 psig and about 20 psig are preferred. Elevated temperatures and pressures may of course be used for high K value PVP as well as for low K value PVP, but are not generally considered desirable because of the need for pressurized equipment and the additional energy requirements needed for maintaining such conditions.

In practicing the invention t-Butylperoxypivalate initiator is generally used in amounts between about 0.1% and about 5 weight percent (wt %) based on vinylpyrrolidone monomer. Isopropyl alcohol or sec. butyl alcohol functions both as solvent and as a chain transfer agent so that relatively larger amounts of alcohol as a percentage of the amount of monomer used serve to product PVP of decreasing K value. Isopropyl alcohol is especially preferred for use in the invention and is generally used except when PVP of exceptionally high K values are desired. When used isopropyl alcohol is frequently present in amounts between about 5 wt % and about 100 wt % based on monomer. For PVP of exceptionally low K value, it may be desirable to use increased amounts of initiator or relatively high temperatures or pressures in order to reduce the amount of alcohol chain transfer agent needed.

The amount of water used in the process of the invention may vary widely depending upon the K value desired for the PVP product and the amount of isopropyl or sec. butyl alcohol chain transfer agent used. For manufacturing PVP of very low K value, i.e. about 30 or below, it is frequently desirable to omit the water completely and use only sec. butyl alcohol or more preferably isopropyl alcohol. For high K value product the amount of water may be increased with water being used as the only solvent for manufacturing PVP of high K value, e.g. about 90 or above. For ease of processing, the total amount of solvent, i.e. water plus isopropyl or sec. butyl alcohol is preferably between about 40 wt % and about 100 wt % based on the amount of monomer used.

The invention may be practiced as either a batch or continuous process, however, continuous or semi-continuous addition of vinylpyrrolidone monomer and t-Butylperoxypivalate initiator is preferred especially in making PVP of low K value.

While PVP product of the process of the invention may include any water and/or isopropyl or sec. butyl alcohol used in making PVP, it is generally preferred to remove at least the alcohol and frequently both the water and the alcohol after the polymerization reaction is complete. Alcohol may be readily removed by distillation and where water and alcohol are both present, an azeotropic mixture is readily removed by distillation. For ease in removing product from the reaction zone it is generally preferred that the product be removed as a water solution. For this purpose an aqueous solution of between about 20 wt % and about 60 wt % solids is preferred. Where water is not used in the process in sufficient quantities for this purpose, it is generally preferred to introduce water to the reaction zone as alcohol is distilled off in order to allow withdrawal of the PVP product as an aqueous solution. Following withdrawal from the reaction zone the aqueous solution of PVP may be transported or stored or water may be removed as by spray drying to produce a solid PVP product.

The following examples are intended to illustrate the invention without limiting the scope thereof.

EXAMPLE I

A 12 liter four-necked flask equipped with mechanical stirrer, reflux condenser, thermometer, and glass stopper was purged with nitrogen for 15 minutes. 1150 grams of vinylpyrrolidone and 3850 grams of distilled water were then charged and a positive nitrogen pressure was maintained throughout the reaction. The reactants were heated to 55° C. in 20 minutes and 3 milliliters (ml) of t-Butylperoxypivalate was then added to the vinylpyrrolidone/water mixture through one of the necks of the flask. The temperature of the reactor was then maintained at 55° C. for 3 hours after which the system was heated to 80° C. in one-half hour and maintained at 80° C. for another 15 minutes. The reactor was then cooled to room temperature and the product discharged. The product had the following properties:

| density | 0.8493 gm/ml |
| K value | 91.1 |
| APHA color | 5/10 |

| vinylpyrrolidone | 0.054 wt % |

EXAMPLE 2

A 2 liter kettle equipped with mechanical stirrer, reflux condenser, thermometer and glass stopper was purged with nitrogen for 10 minutes after which the following ingredients were charged under a blanket of nitrogen:

| 712 g | distilled water |
| 68 g | isopropanol |
| 42 g | vinylpyrrolidone |
| 2.1 g | t-Butylperoxypivalate |

The reactants were heated to 70° C. after which an additional 378 grams of vinylpyrrolidone was added continuously over a two-hour period during which the temperature was maintained at 70° C. The temperature was then held at 70° C. for an additional hour after which an additional 1 gram of t-Butylperoxypivalate was added. The temperature was then maintained at 70° C. for an additional hour following which the kettle was cooled and the product was discharged. Analysis indicated the product had a solids content of 36.26 wt % and a K value of 63.1.

EXAMPLE 3

A 2 liter kettle equipped as described in Example 2 was purged with nitrogen for 10 minutes and then maintained under a nitrogen blanket. After the initial nitrogen purge the following ingredients were added:

| 390 g | distilled water |
| 390 g | isopropyl alcohol |
| 42 g | vinylpyrrolidone |
| 2.1 g | t-Butylperoxypivalate |

The mixture was then heated to a gentle reflux (82° C.) and maintained at reflux while an additional 378 grams of vinylpyrrolidone was added continuously over a 2 hour period. The temperature was then held for an additional ½ hour and then reduced to 70° C. After that 1 gram of t-Butylperoxypivalate was added and the mixture was heated to reflux again and held for 1 hour after which another 1 gram of t-butylperoxypivalate was added and the temperature again held at reflux for 1 hour. Following this the product was cooled and discharged. The product had a solids content of 37.76 wt % and a K value of 41.8.

EXAMPLE 4

A 2 liter kettle equipped as described in Example 2 was purged with nitrogen for 10 minutes and the following ingredients were charged under a blanket of nitrogen:

| 780 g | isopropanol |
| 42 g | vinylpyrrolidone |
| 2.1 g | t-Butylperoxypivalate |

The mixture was then heated to a gentle reflux at 82° C. after which an additional 378 grams of vinylpyrrolidone was continuously added over a 2 hour period while the temperature was maintained at reflux. The temperature was then held at reflux (about 85° C.) for an additional ½ hour after which another 1 gram of t-Butylperoxypivalate was added and the temperature was maintained at reflux for another hour. An additional 1 gram of t-Butylperoxypivalate was then added and the temperature again maintained at reflux for 1 hour. The kettle was then changed to a distillation mode and 780 grams of isopropyl alcohol were distilled off at atmospheric pressure. Simultaneously 780 grams distilled water were added. During the distillation of isopropyl alcohol and addition of water the temperature was maintained at 85° C. The product was then cooled and discharged. The product contained 36.66 wt % solids and had a K value of 30.5.

While the invention has been described above with respect to polymerization of pure vinylpyrrolidone monomer it will be understood that minor amounts of various other monomers copolymerizable with vinylpyrrolidone may frequently be incorporated without detriment, although incorporation of more than about 10 wt % based on vinylpyrrolidone of such additional monomers may effect the operating conditions or proportions of ingredients needed to obtain polymer of desired K value.

EXAMPLE 5

Eight hundred and fifty grams of isopropanol was charged into a one liter kettle equipped with a thermometer and condenser. After 150 gms of isopropanol was distilled off, the kettle was heated to 120° C. under 50 psig pressure. The following ingredients were charged into a mixing tank:

| | |
|---|---|
| 700 g. | isopropanol |
| 600 g. | vinylpyrrolidone |
| 25.5 g. | t-Butylperoxypivalate |

The mixture was then pumped into the kettle over a period of two hours. At the end of two hours, another 5 gms of t-Butylperoxypivalate in 50 ml isopropanol was added to the kettle. The kettle was maintained at 120° C. and 50 psig pressure for an additional ½ hour and then cooled down and discharged. The product had a solids content of 31.3% and K value of 12.2 with very narrow molecular weight distribution.

While the invention has been described above with respect to certain preferred embodiments, it will be understood by those skilled in the art that various changes and modifications may be made without departing from the spirit or scope of the invention.

What is claimed is:

1. Process for making polyvinylpyrrolidone homopolymer which comprises polymerizing N-vinylpyrrolidone monomer in a reaction zone in the presence of free radical initiator consisting essentially of t-Butylperoxypivalate.

2. Process according to claim 1 wherein the polymerization is carried out in solvent consisting essentially of water or isopropyl alcohol or sec. butyl alcohol or mixtures thereof.

3. Process according to claim 2 wherein the solvent consists essentially of isopropyl alcohol.

4. Process according to claim 2 wherein the solvent consists essentially of water.

5. Process according to claim 2 wherein the solvent consists essentially of a mixture of isopropanol and water.

6. Process according to claim 5 wherein the alcohol is removed by distillation following completion of the polymerization of the N-vinylpyrrolidone.

7. Process according to claim 3 wherein following polymerization of the N-vinylpyrrolidone alcohol is removed by distillation with simultaneous addition of water.

8. Process according to claim 2 wherein the polymerization is carried out at a temperature between about 40° and about 150° C. and a pressure between about 0 and 150 psig.

9. Process according to claim 8 wherein:
    (a) the solvent is a mixture of isopropyl alcohol and water containing between about 40 and about 100 wt % water,
    (b) t-Butylperoxypivalate is present in the reaction zone in an amount between about 0.1% and about 5 wt % based on monomer.

10. Process according to claim 2 wherein t-Butylperoxypivalate is used in an amount between about 0.1 and about 5 wt % based on monomer.

11. Process according to claim 10 wherein the polymerization is carried out at a temperature between about 100° and about 150° C. and a pressure between about 20 psig and about 150 psig to produce polyvinylpyrrolidone having a K value between about 10 and about 20.

12. Process according to claim 10 wherein the polymerization is carried out at a temperature between about 40° and about 100° C. and a pressure between about 0 psig and about 20 psig to produce polyvinylpyrrolidone having a K value between about 20 and about 100.

* * * * *